Figure 1:
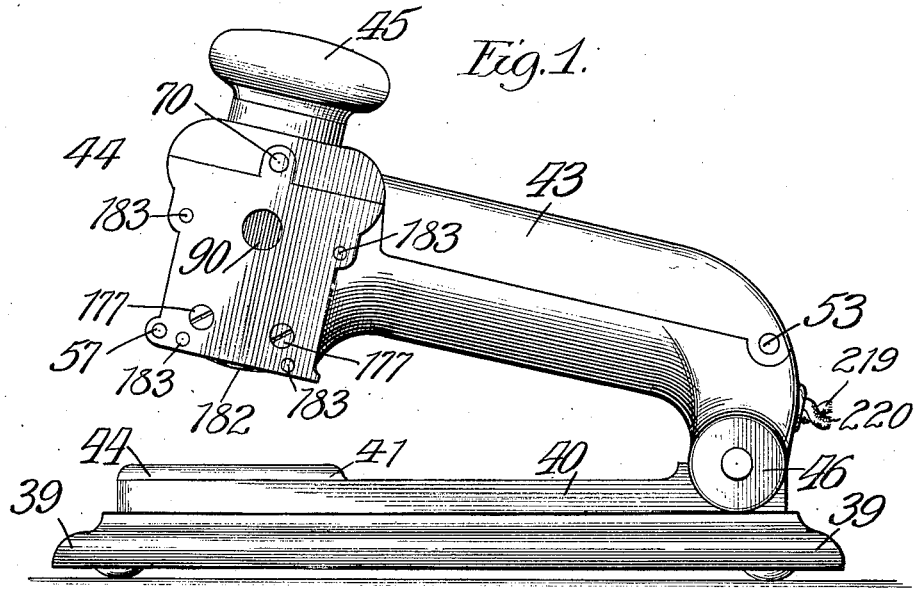

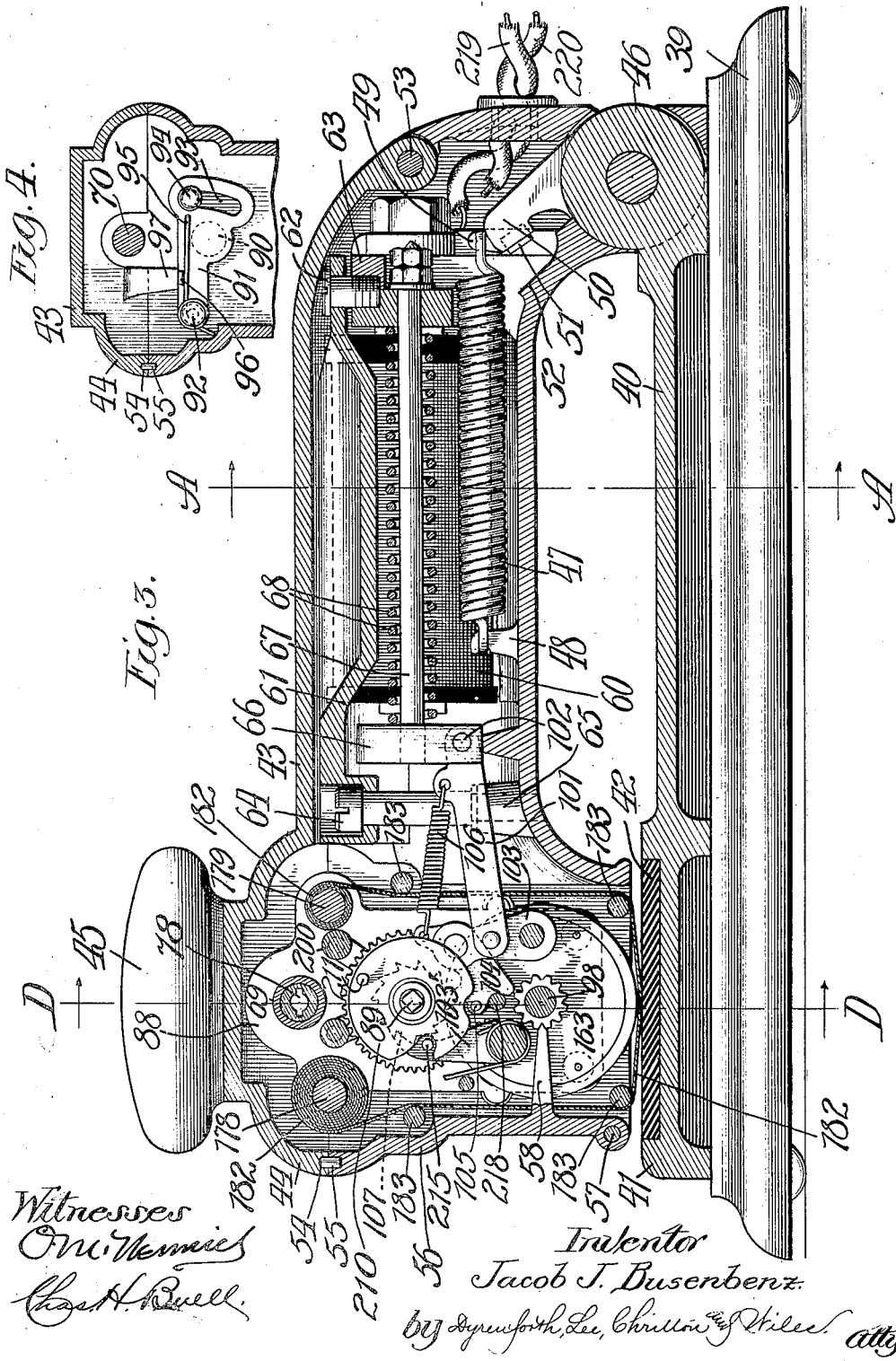

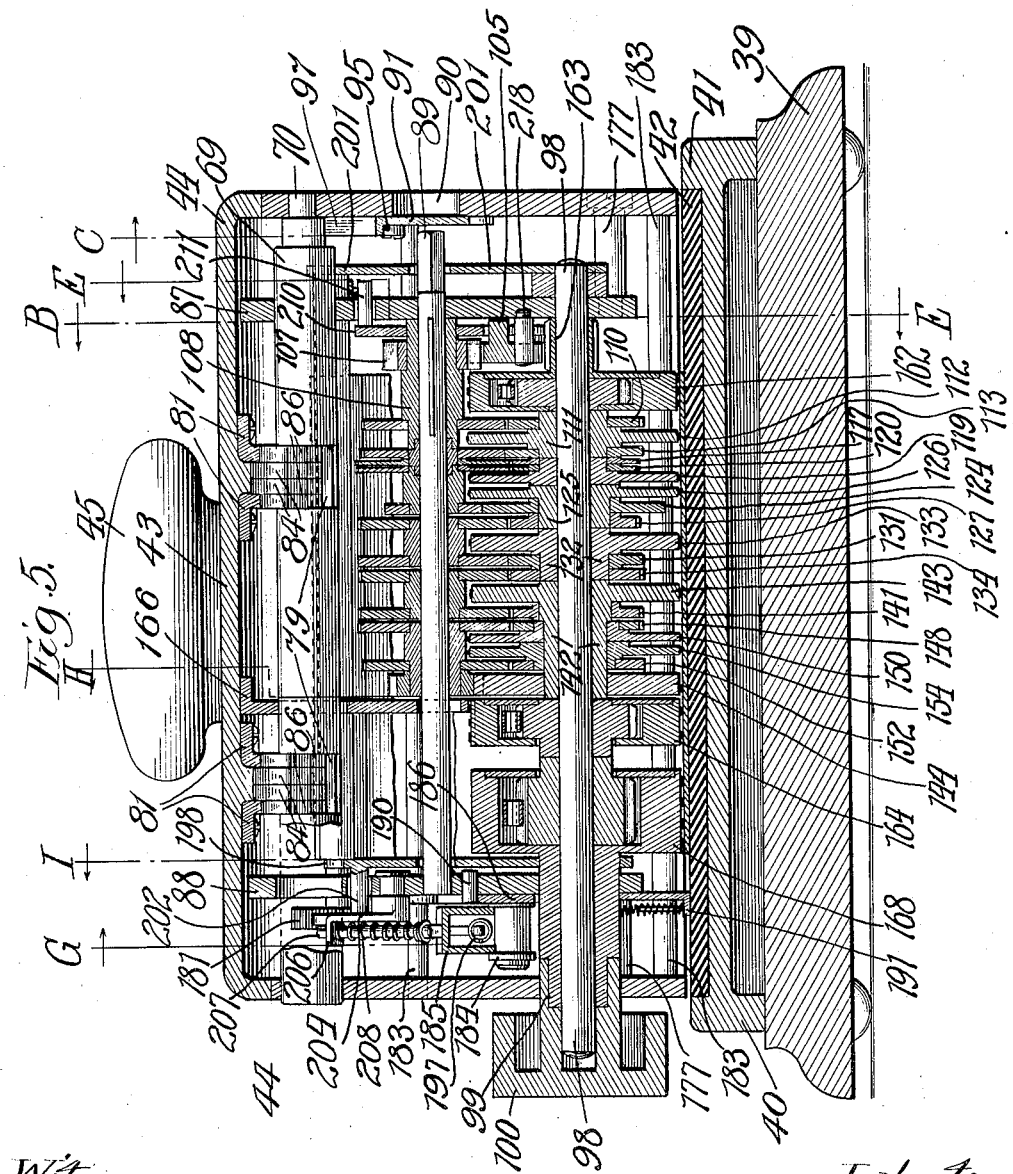

J. J. BUSENBENZ.
TIME STAMP.
APPLICATION FILED NOV. 29, 1907.
938,410.
Patented Oct. 26, 1909.
13 SHEETS—SHEET 4.
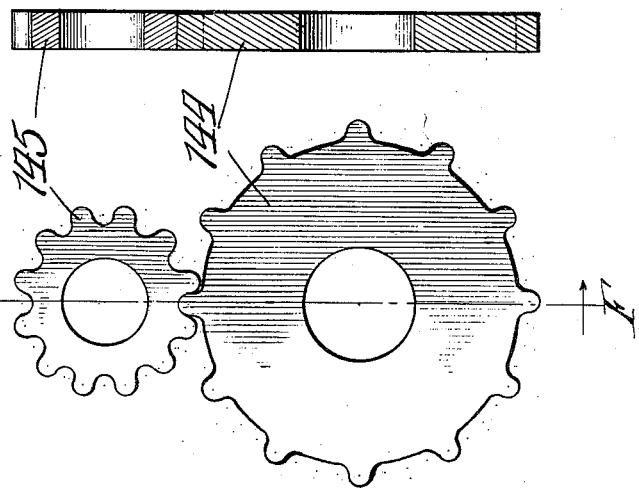
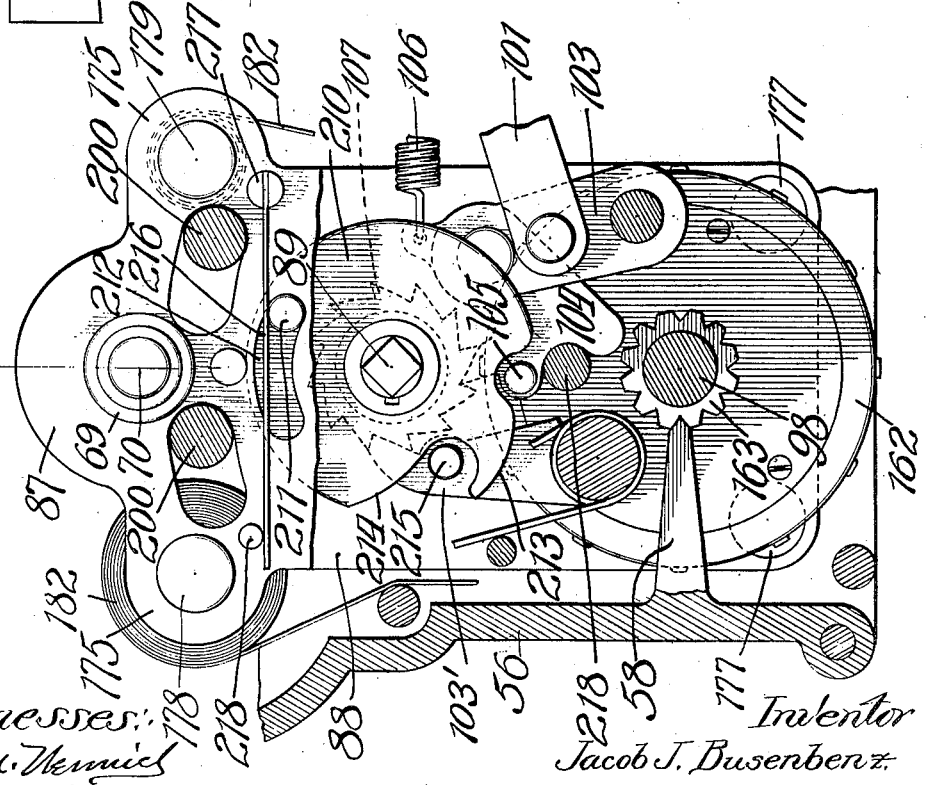
Witnesses:
Inventor
Jacob J. Busenbenz
By Dyrenforth, Lee, Chritton & Wiles
attys.

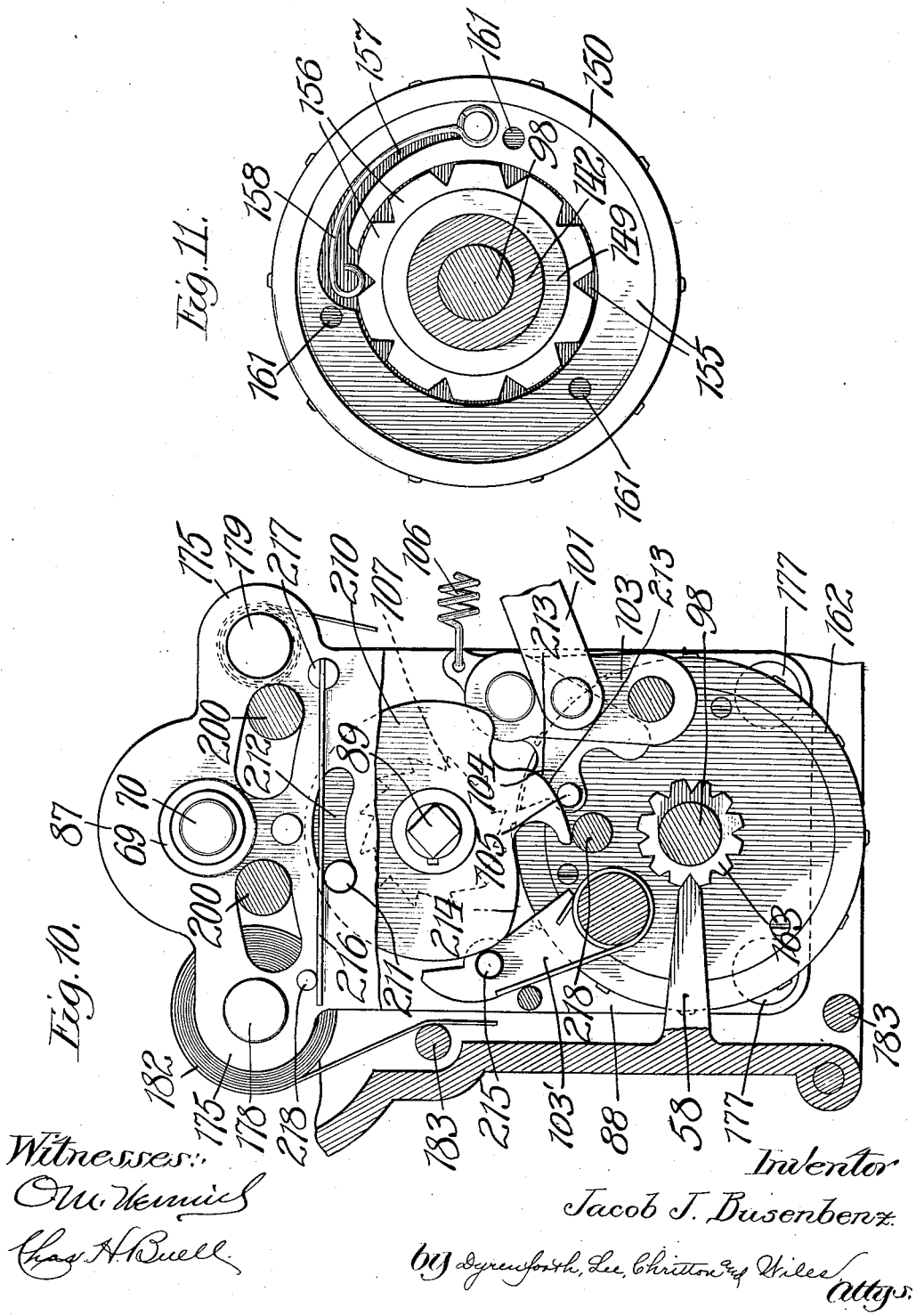

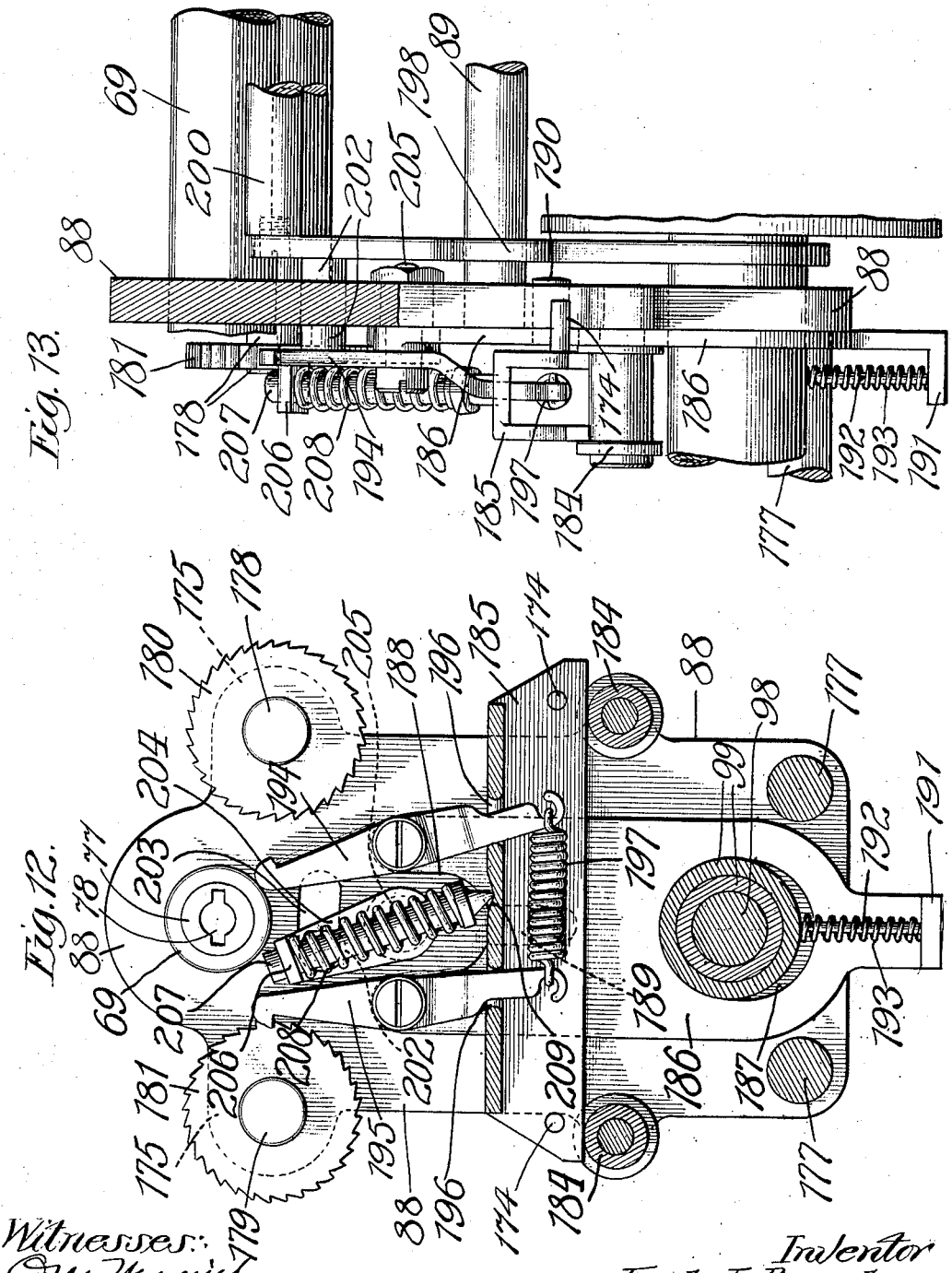

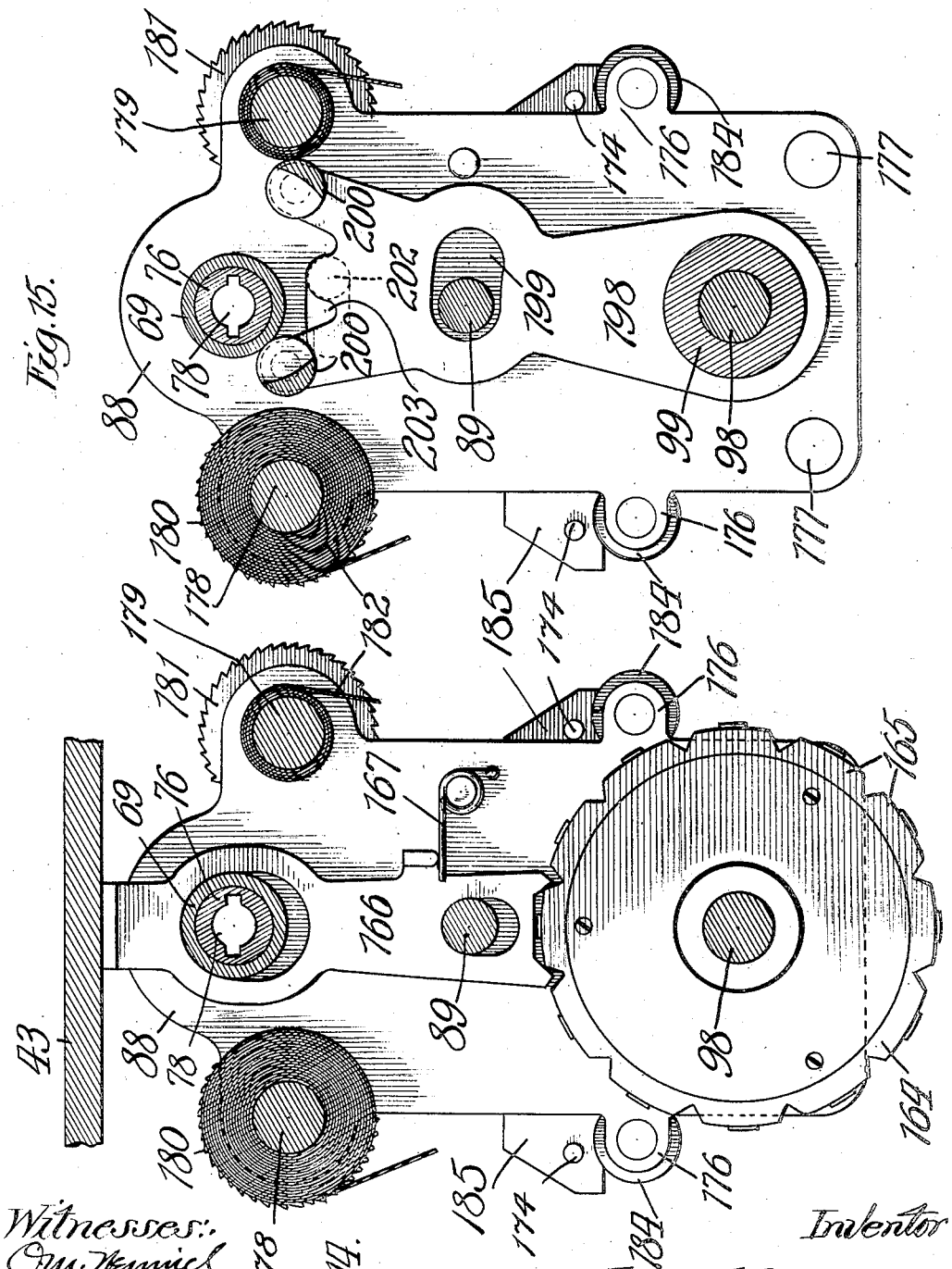

J. J. BUSENBENZ.
TIME STAMP.
APPLICATION FILED NOV. 29, 1907.
938,410.
Patented Oct. 26, 1909.
13 SHEETS—SHEET 8.
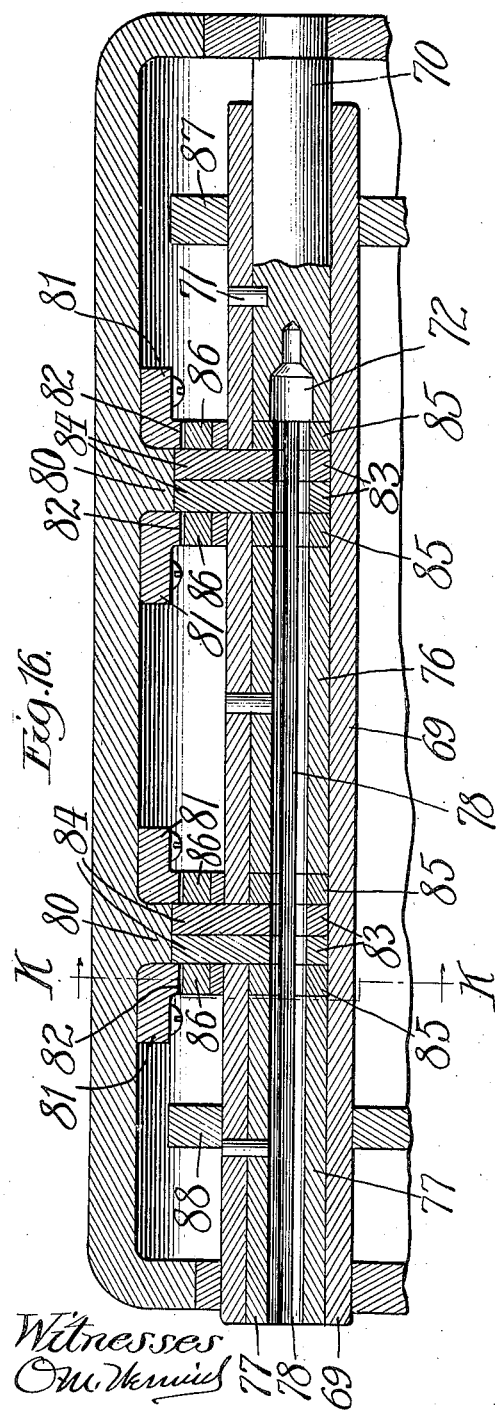
Witnesses
Inventor
Jacob J. Busenbenz
By Dyrenforth, Lee, Chritton & Wiles
Attys.

J. J. BUSENBENZ.
TIME STAMP.
APPLICATION FILED NOV. 29, 1907.
938,410.
Patented Oct. 26, 1909.
13 SHEETS—SHEET 9.
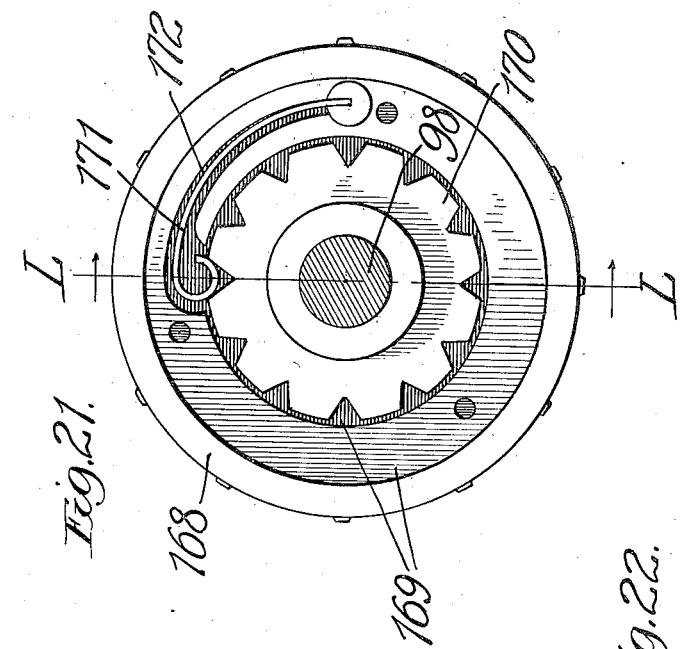
Fig. 21.
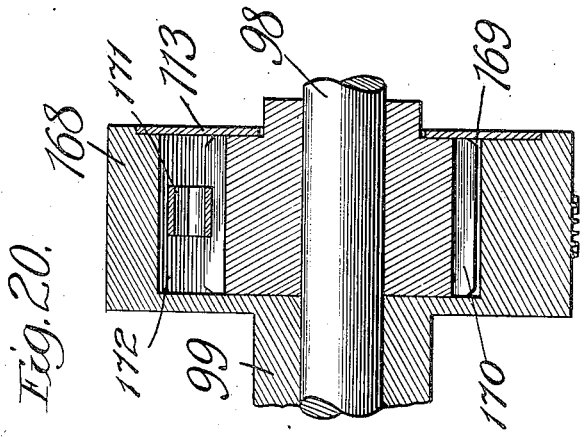
Fig. 20.
Fig. 22.
SHIP'D
FIL'D
CANC'D
FINSH'D
START'D
OUT
IN
CHC'D
PAID
REC'D
ANS'D
Witnesses:
Inventor
Jacob J. Busenbenz.
Dyrenforth, Lee, Chritton & Wiles
Attys

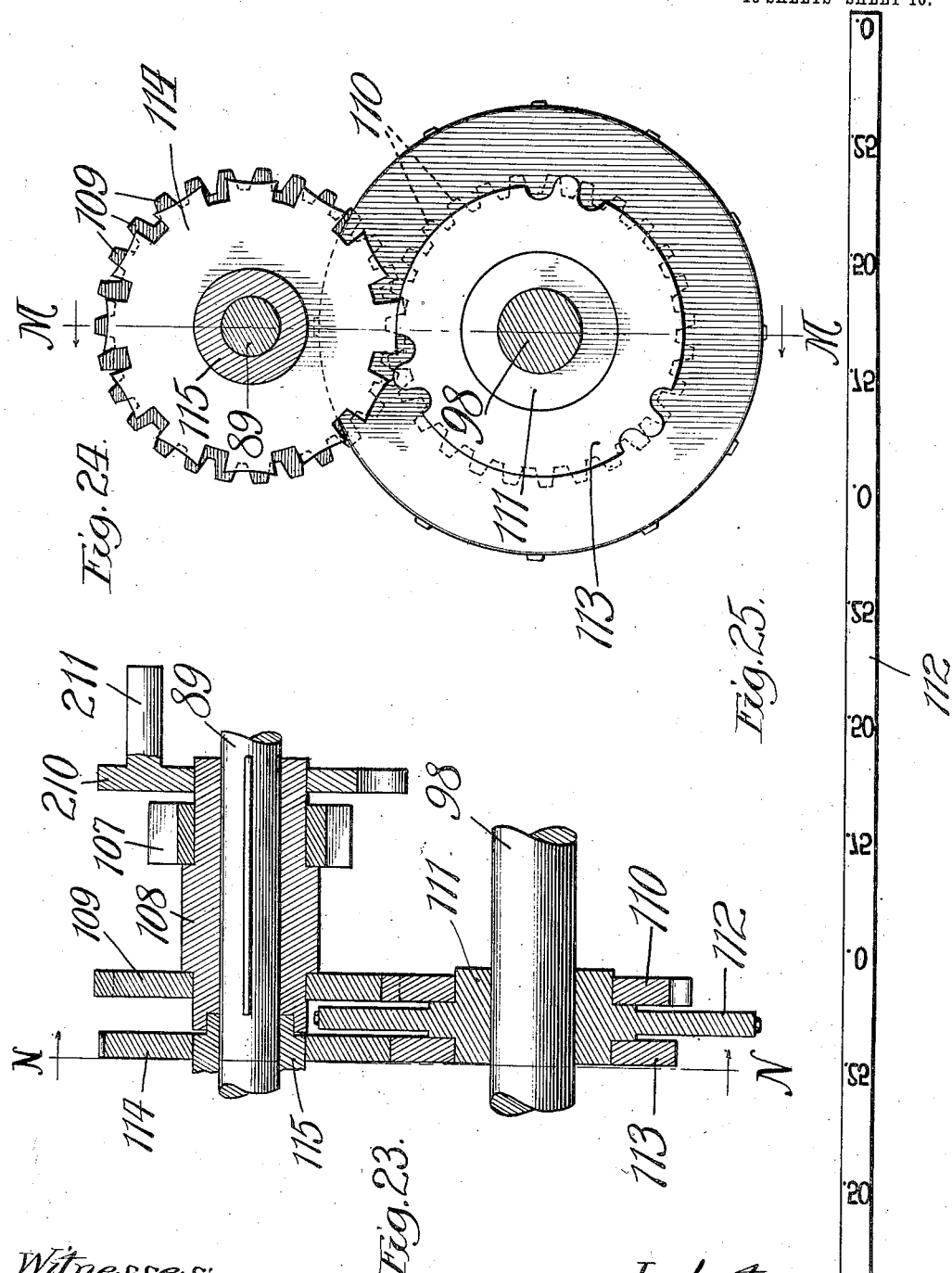

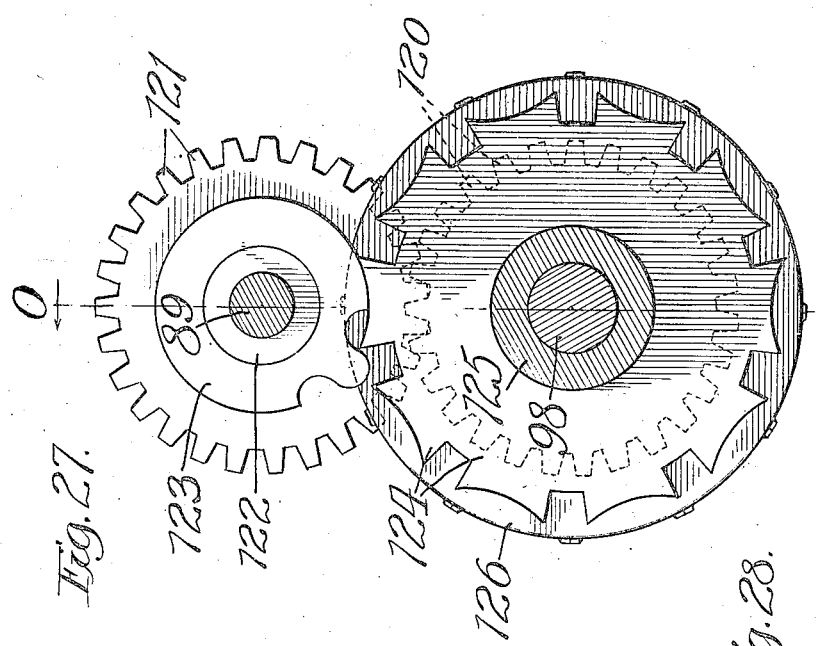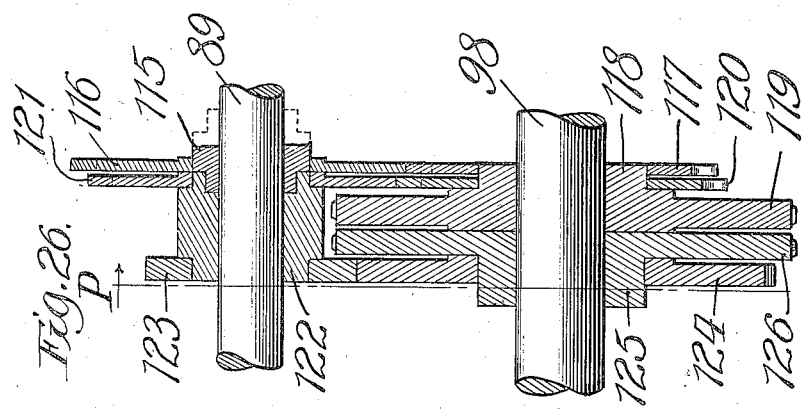

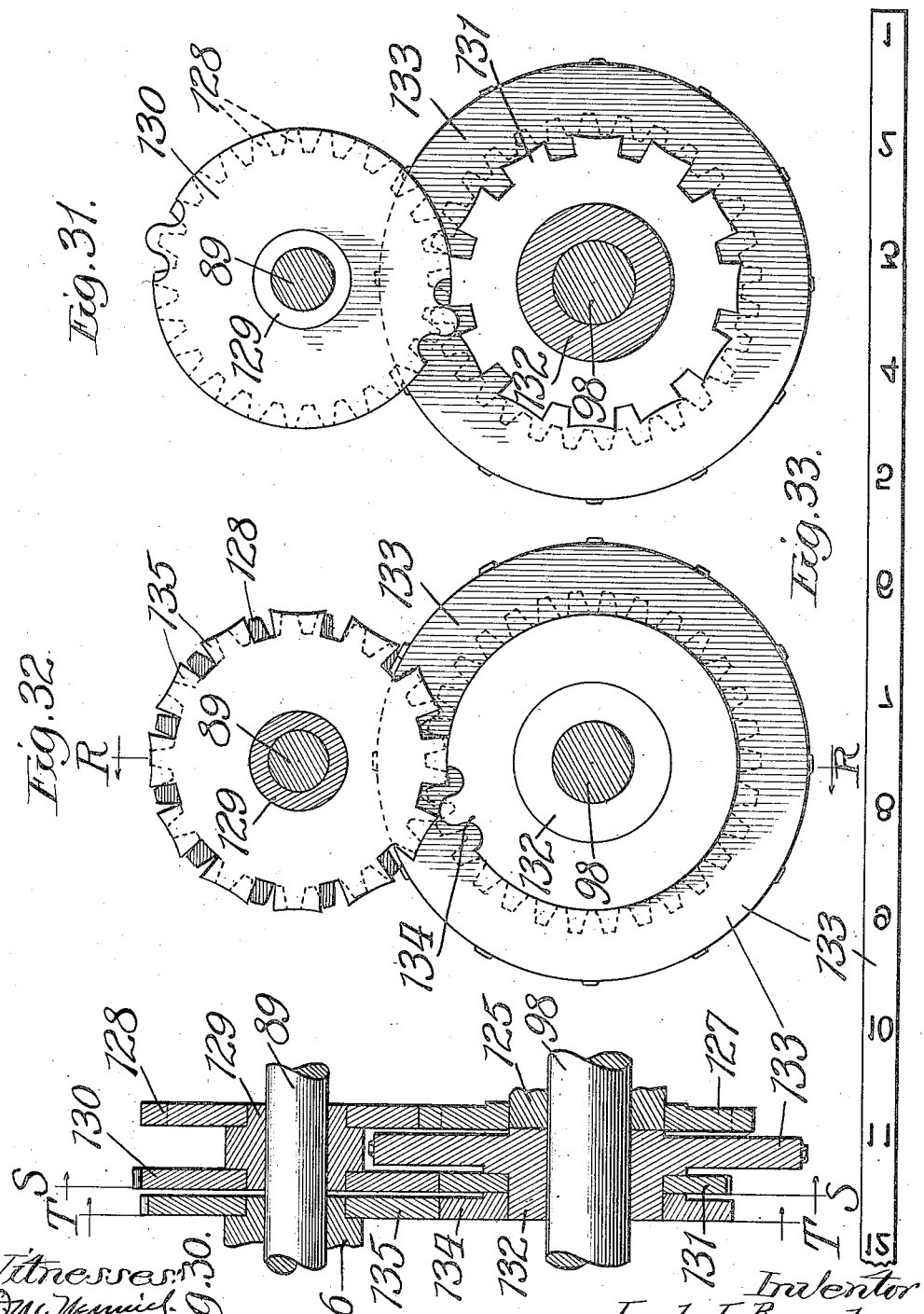

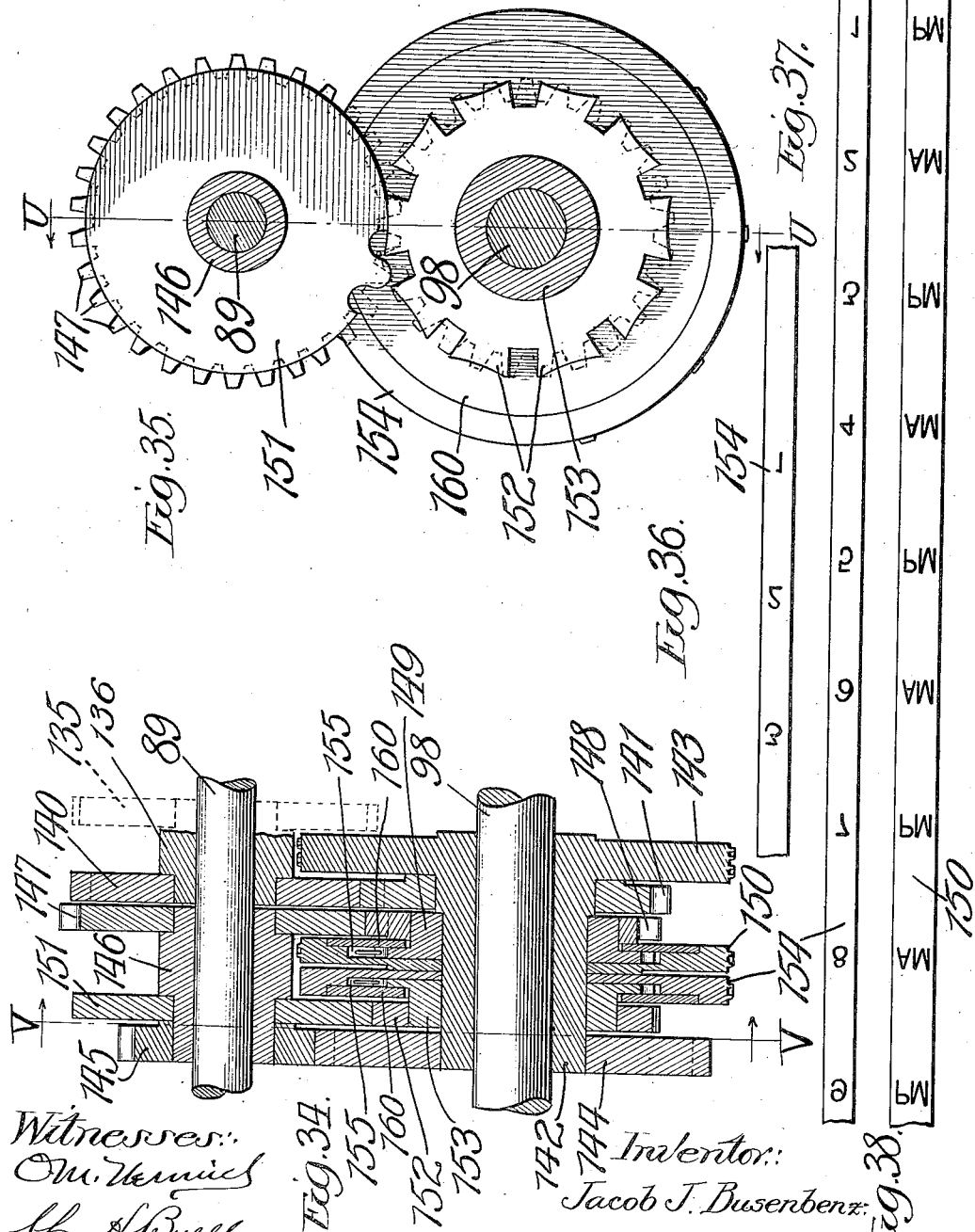

UNITED STATES PATENT OFFICE.

JACOB J. BUSENBENZ, OF CHICAGO, ILLINOIS.

TIME-STAMP.

938,410.  Specification of Letters Patent.  Patented Oct. 26, 1909.

Application filed November 29, 1907. Serial No. 404,398.

*To all whom it may concern:*

Be it known that I, JACOB J. BUSENBENZ, a citizen of the United States, residing at 746 Montrose avenue, Chicago, in the county of Cook and State of Illinois, have invented a new and useful Improvement in Time-Stamps, of which the following is a specification.

Time-stamps may properly be divided into two distinct classes, the first of these being characterized by dial-impression resulting from the operation of the stamp, and the second by the employment of type arranged to print in a straight line.

My invention relates to improvements in the last-named, or straight-line-impression class of time-stamp which is usually adapted to bring automatically into position for stamping, the day, the meridian (A. M. and P. M.), the hours, the minutes and fractions of a minute, and in some instances the months and years. The impression of this class of time-stamp is taken directly from revoluble type-wheels carrying the printing characters on their peripheries, these wheels being actuated by pawls engaging with ratchets on the wheels, detents being provided to coöperate with the pawls. In this construction there is, thus, no absolute fixed connection of any kind between the printing wheels and their actuating mechanism. While a time-stamp of this class has a wide range in the matter of automatically taking care of the minute, the hour, and the day of the month, it is always liable to become disorganized by throwing the separate units or divisions of time out of their order; and the practical difficulty of resetting the wheels to correct such disorder has been found to present a serious objection to the use of this class of time-stamp.

The primary object of my invention is to avoid the objection referred to, without sacrificing any of the advantages of the ordinary straight-line-impression type of stamp; and this I accomplish, generally stated, by directly gearing together, as a train, the printing wheels in a manner to cause them to be absolutely interlocked and to render their relative positions in the train of gears unchangeable, except as they are changed automatically to adapt the wheels to record the advance of time; thereby, moreover, producing the additional advantage of affording mechanical conditions that render the operation of the stamp so simple that it may be safely instrusted to the ordinary office-help.

Figure 2:
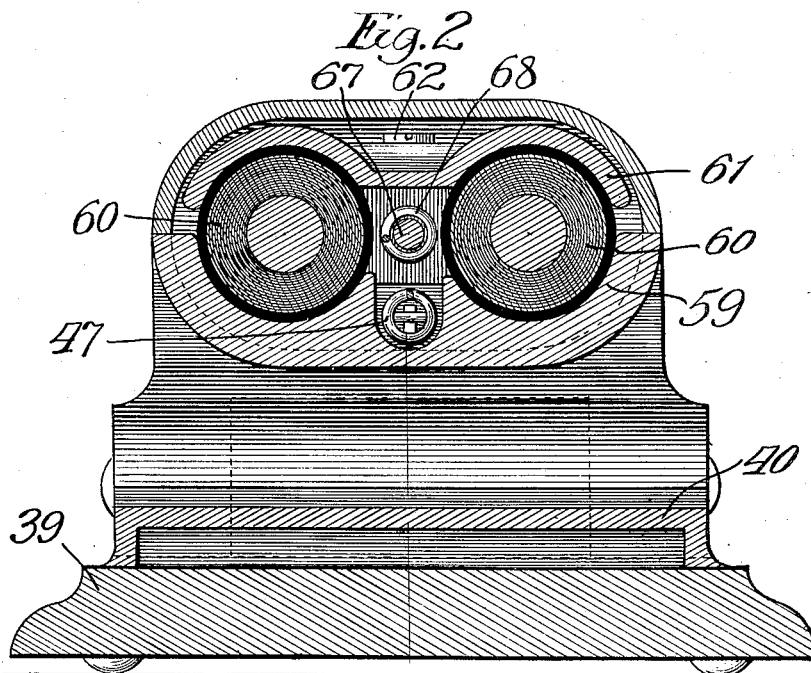

In the accompanying drawings, Figure 1 shows my improved time-stamp in its normal condition by a view in side elevation. Fig. 2 is a section on the line A—A, Fig. 3, and Fig. 3, an enlarged longitudinal section through the entire device on line B, Fig. 2, and on line B, Fig. 5, showing it in the position of stamping. Fig. 4 is a broken section on line C, Fig. 5, showing shutter means for automatically opening and closing a key-insertion opening in the case. Fig. 5 is a section on line D—D, Fig. 3, showing all the type-wheel actuating mechanism in the head of the casing in sectional elevation. Fig. 6 is a broken plan view of a sheet or strip which has been stamped by the device. Fig. 7 is an enlarged broken section on the irregular line E—E, Fig. 5. Fig. 8 is a view in elevation of one of the gear-wheels and the pinion meshing therewith, employed in the train of gears, and Fig. 9 is a section on line F—F, Fig. 8. Fig. 10 is a view similar to that presented by Fig. 7, but showing the pawl and detent of the primary actuating ratchet of the device thrown out of engagement therewith. Fig. 11 is a view in side elevation showing one of the type-wheels with its face-plate removed. Fig. 12 is a section on line G, Fig. 5, and Fig. 13, a view in broken side elevation of the mechanism shown in Fig. 12. Figs. 14 and 15 are sections respectively on the irregular line H and the line I, Fig. 5, but showing on Fig. 15, a pivotally movable slotted arm omitted from Fig. 14, to avoid confusion in the last-named figure. Fig. 16 is an enlarged broken sectional view of the case-locking mechanism taken on line D, Fig. 7; Fig. 17, a broken section on line K—K, Fig. 16, Fig. 18, a detail view in side elevation of one of the two similar tumblers for the lock shown in Fig. 16, and Fig. 19 a view in side elevation of the key. Fig. 20 shows the character-wheel by an enlarged section on line L—L, Fig. 21, and Fig. 21 is a view of the same in side elevation with its face-plate removed. Fig. 22 is a developed view of the wheel shown in Fig. 20, representing characters that may be provided thereon. Fig. 23 is a section on line M—M, Fig. 24, showing the primary actuating ratchet with its barrel and gear and the fractional-minute type-wheel driven by it; Fig. 24, a section on line N—N, Fig. 23, showing two intermeshing gears in elevation, and Fig. 25, a broken developed view of the type-wheel of Figs. 23 and 24. Fig. 26 is a section on line O, Fig. 27, showing, in elevation, gearing for transmitting motion to type-wheels; Fig. 27, a sectional view on line P, Fig. 26, showing the gears of the last-named figure in elevation, and Figs. 28 and 29, are developed views of the two type-wheels shown in Fig. 26. Fig. 30 is a section on line R—R, Fig. 32, through gearing for transmitting motion to certain other type-wheels; Figs. 31 and 32 are sections respectively on lines S—S, and T—T, Fig. 30, showing in elevation the gear-wheels of Fig. 30, and Fig. 33 is a developed view of the type-wheel shown in Fig. 30. Fig. 34 is a section on line U—U, Fig. 35, showing gearing for transmitting motion to still other type-wheels; Fig. 35 is a section on line V—V, Fig. 34, showing in elevation the gears of the last-named figure, and Figs. 36, 37 and 38, are broken developed views, respectively of the three type-wheels shown in Fig. 34.

The base 39 of the time-stamp, which may be formed of wood, is shown to be surmounted by a ribbed metal plate 40, the forward end of which forms the impression-bed 41, containing as an insert a suitable impression pad 42 to receive the impact of the type-wheels, hereinafter described. The base, as will be observed contains no mechanism whatever, all of the actuating mechanism of the device being housed in the casing 43 in close association with the stamping mechanism. The casing which consists of a curved neck-portion terminating in a head 44, from the top of which extends the hand-pounded knob 45, is hinged at the rear end of its neck portion to the adjacent end of the base, as represented at 46, and is maintained in the normally raised position represented in Fig. 1 by the tension of a coiled spring 47 fastened at one end to a lug 48 (Fig. 3) in the neck, and at its opposite end to a lug 49 on a rigid finger 50 provided at the rear end of the base and carrying a cushion 51 to be engaged by a face 52 on the inner side of the casing for limiting the extent of rise of the latter under the recoil-force of the spring 47. The casing is formed of two main sections, the upper one of which, as a cap, is hinged at its rear end, as shown at 53, to the adjacent end of the lower section; and it contains in its forward end, at which it forms part of the head 44, a socket 54 to receive the dowel-pin 55 projecting from the upper edge of a door 56, also forming part of the head to which it is hinged at 57, this door carrying an inwardly projecting rigid finger 58, for the purpose hereinafter explained. On the bottom of the interior of the neck-portion of the casing is formed a seat 59 (Fig. 2), of general W-shape, for the two spools of an ordinary electromagnet 60, which is rigidly confined or anchored in place by a saddle 61 of corresponding shape in cross-section to bear against and fit the spools, being securely fastened in place at one end by a screw 62 introduced into a cross-piece 63 formed on the interior of the casing and at its forward end by a screw 64 inserted into a post 65 rising from the base of the casing. The armature 66, which crosses the poles of the two magnet-spools, is carried on a rod 67 reciprocably supported and having confined about it a spiral spring 68 tending to force the armature away from the magnet-cores.

All of the printing mechanism of the time-stamp, as also the time-controlled actuating means therefor and the inked ribbon, take-up and pay-out mechanism, are housed in the casing-head 44; and to render them accessible for repairs and the like while safeguarding them against unauthorized access, the upper hinged section of the casing is provided with means for locking it in place; and following is a description of such means, particular reference being had to Figs. 5 and 16 to 19, inclusive.

A continuous cylindrical tube 69 is rigidly supported at one end in a side wall of the head 44 to extend horizontally across the same and contains in its opposite-end portion a plug 70 having its bearing at its reduced projecting end in the opposite side-wall of the head. This plug which is non-rotatably confined in the tube by a pin 71, contains in its inner-end a central socket 72 to receive the forward reduced end of a suitable key 73 shown in Fig. 19 to be provided on its stem with laterally projecting wings 74 and 75. At intervals in the tube 69, and pinned therein against rotation, are the filling-sleeve 76 and 77 containing central longitudinal key-passages 78 alining with the socket 72 and laterally recessed along their opposite sides to guidingly receive the winged stem of the key. At each space at an end of the filling-sleeve 78 the tube 69 contains a longitudinal slot, as shown at 79 in Figs. 5 and 17. Coincident with each slot there depend rigidly from opposite sides of a rib 80 on the top of the casing-head similar tumbler-engaging brackets 81, 81, each containing an arc-shaped recess 82 slightly expanded at its inner end; and the depending portion of each bracket conforms to and fits about an arc-shaped section of the tube 69. Between each pair of the brackets are confined two similar key-ways 83 in the form of rings containing central openings of the shape in cross-section of the passage 78 and each having extended from it through a slot 79 a segment-shaped head 84; and the rings 83 are confined in the tube 69 between similar key-way forming rings 85 each having extended from it a tumbler 86 conforming in shape to that of the recess 82 and riveted at 87 to the adjacent head 84.

By inserting the key 73 into the key-way to register its wings 74 with the innermost rings 83 and 85, and its wings 75 with the outermost rings 83 and 85, turning the key will turn with it the said rings to lock or unlock the upper hinged section of the casing, depending upon the direction of turning the key, since thereby the tumblers 86 will be turned to introduce them into or withdraw them from the recesses 82. The tumblers are slightly yielding resiliently toward their expanded ends to adapt them to snap into releasably interlocking condition with the correspondingly enlarged innerends of the recesses 82; and the segments 84 tend to reinforce the tumblers, which are comparatively light, by taking off the latter the weight of the upper hinged section of the casing, the head-portion of which bears against the segments in the locked condition of the device.

Inside the head 44 are suspended from near the opposite ends of the sleeve 69 two similar bearing-plates 87 and 88 of the contour most clearly illustrated in Figs. 10, 12, 14 and 15. These plates afford bearings for the ends of a rotatable shaft 89 adapted to have a key applied to it at one end, for the purpose hereinafter explained, this end being coincident with an opening 90 in the casing normally closed by the shutter-device shown in Fig. 4 as comprising a shutter 91 in the form of an arm pivoted at one end to the adjacent side of the casing-head, at 92, and expanded toward its opposite end in which it contains an arc-shaped slot 93 through which projects from the casing-side a headed stud 94 for confining the shutter in its movements. The shutter is given a normal tendency to rise and uncover the key-hole 90 by a spring 95 confined toward its free end by a lug 96 projecting from a side of the shutter into the path of a lug 97 on the cap 43, whereby closure of the cap bears the lug 97 against the shutter to close it, and in closing it tensions the spring 95, so that when the cap or upper casing-section is raised, the recoil of the spring will open the shutter to uncover the hole 90 and afford access to the shaft 89 with a key.

In the lower parts of the suspended plates 87, 88 is rigidly supported a shaft 98 carrying rotatably on one end a sleeve 99, which is formed integral with the character-wheel of the stamping mechanism hereinafter described. This sleeve passes at its reduced outer end through the adjacent side-wall of the casing-head, in which it is engaged by the tubular stem on a knob or handle 100 provided for turning the character-wheel when desired.

From the lower part of one end of the armature 66 extends a link 101 pivoted at one end to the armature at 102. The free end of this link is pivotally connected to a second link 103, which in turn is pivoted at one of its ends to the plate 87 by means of a stud projecting inwardly from the same. To the free end of the link is pivoted a pawl 104 provided with a pin 105 for the purpose which will hereinafter appear, and also with an ear into which is hooked one end of a spring 106 having its opposite end engaging a similar ear upon the link 101. The tension of the spring 106 causes the tooth of the pawl to normally engage a twelve-tooth ratchet 107 upon the shaft 89 and held by a spring-pressed detent $103^1$. This is the only pawl-and-ratchet mechanism employed in the stamping mechanism of the device.

Following is a detailed description of the train of gear-driven type-wheels rotatably mounted on the two shafts 89 and 98: On a sleeve 108 (Fig. 23), keyed to the shaft 89 and upon which is rigidly mounted the ratchet 107, is similarly mounted at the opposite end of the sleeve a 27-tooth gear 109 having the same motion as the ratchet. This gear meshes with a 27-tooth gear 110 secured about one end of the hub 111 of a type-wheel 112, the hub loosely surrounding the shaft 98; and this type-wheel is provided at intervals about its periphery with three sets of the numbers .0, .25, .50, .75, as represented in Fig. 25, to denote, decimally, fourths of a minute or intervals of fifteen seconds. On the opposite end of the hub 111 is secured a three-tooth Geneva-pinion 113 having the same motion as the ratchet and meshing with a 12-space Geneva gear 114 (Figs. 23 and 24), secured on a hub 115 loosely surrounding the shaft 89. The diameters of the pinion 113 and gear 114 are equal. On the hub 115 is secured a 30-tooth gear 116 (Fig. 26) meshing with a 25-tooth gear 117 on the hub 118 of the minute-units type-wheel 119, this hub loosely surrounding shaft 98. The proportions of these two last-named gears are as 12–10. The printing-wheel 119 is provided about its periphery with spaced numerals from 0 to 9 (Fig. 29). On the hub 118 is also secured a 27-tooth gear 120 (Figs. 26 and 27), meshing with a similar gear 121 secured on a hub 122 loosely surrounding the shaft 89, this hub carrying also a 1-tooth Geneva-pinion 123 meshing with a 10-space Geneva-gear 124 secured on the hub 125 loosely surrounding the shaft 98, of the minute-tens printing type-wheel 126 having type spaced about its periphery in the order 0—0—1—1—2—2—3—3—4—4—5—5— (Fig. 28). The hub 125 also carries a 30-tooth gear 127, (Fig. 30) meshing with a 25-tooth gear 128 on a hub 129 loosely surrounding the shaft 89 and carrying a 2-tooth Geneva-pinion 130 (Fig. 31), meshing with a 12-space Geneva-gear 131 on the hub 132, loosely surrounding the shaft 98, of a type-wheel 133 carrying type on its periphery of the consecutive numbers 1 to 12 uniformly spaced apart. This last-named hub also carries a 1-tooth Geneva-pinion 134 meshing with a 12-space Geneva-gear 135 (Fig. 32) on a hub 136 loosely surrounding the shaft 89 and carrying a 27-tooth gear 140 (Fig. 34) meshing with a similar gear 141 on the hub 142, loosely surrounding the shaft 98, of the gear of the "meridian" type-wheel 143; and the type on the periphery are arranged and suitably spaced apart to print "A. M." "P. M." six times, or in the order represented in Fig. 38. The hub 142 carries on its opposite end a 24-tooth spacing gear 144 (Fig. 8) having every alternate tooth cut away, thus leaving, actually, only twelve teeth. This gear meshes with a 12-tooth pinion 145 on one end of a hub 146 loosely surrounding the shaft 89 and carrying on its opposite end a 30-tooth gear 147 meshing with a 25-tooth gear 148 secured on the hub 149 loosely surrounding the hub 142, the relation of the gear 147 to the gear 148 being as 12 to 10. The hub 149 is that of the unit-date wheel 150, the type on which are spaced about its periphery and form the numerals 0 to 9 inclusive (Fig. 37). The hub 146 also carries, adjacent to the pinion 145, a 1-tooth Geneva-pinion 151 meshing with a 10-space Geneva-gear 152 secured on the hub 153, loosely surrounding the hub 142 of the tens-day type-wheel 154, the type on the periphery of which bear the numerals 1—2—3— (Fig. 36) with the remainder of the peripheral space left blank (Fig. 36), for the purpose hereinafter described.

It should here be explained that for facility and expedition in adjustment, the unit-day wheel 150 and the tens-day wheel 154, though geared in the train driven from the ratchet 107, as hereinafter described, are independently adjustable by hand without affecting the gears in the train, so that, at the end of each month they may be manually turned back to record the first day of the month. This function is rendered possible by the construction shown in Fig. 34 and most clearly illustrated in Fig. 11. The following description of the mechanism last referred to is given with reference to the wheel 150, but applies equally to the wheel 154 inasmuch as the construction is the same: In the outer face of the type-wheel is formed a recess 155 of stepped shape in cross-section, and containing in its inner deeper section a serrated circumferential flange 156 on the hub 149 which, as aforesaid, loosely surrounds the hub 142. In a curved enlargement 157 of the recess 155 is confined a spring 158 bearing at its free end against the periphery of the flange 156 to engage resiliently with the notches therein. Thus, while the spring connects the type-wheel with the hub 149 with sufficient pressure to cause it to be rotated by the rotation of the hub under the driving action of the gearing, the type-wheel may obviously be manually turned on gaining access to it by unlocking the casing and opening the door 56, as for setting it back without disturbing the set of the gears, because in so turning it the free end of the spring 159 will snap over the teeth on the flange 156. The recess in the face of the type-wheel is covered by a plate 160 (Fig. 34) secured in place by screws 161 (Fig. 11).

Next adjacent to the ratchet 107 there is provided on the shaft 98, to loosely surround it, the year-type wheel 162 provided about its periphery with a series of numbers denoting years. On a sleeve-extension 163 of this year-wheel is provided a circumferential series of teeth (Figs. 3 and 7), engaged by the finger 58 on the door 56 to prevent accidental turning of the wheel which, as indicated in Fig. 5, involves the same construction as that of the type-wheel shown in Fig. 11 and hereinbefore described, being provided in this instance to enable the periphery of the wheel to be turned independently of its hub, which is rigid on the shaft. On the shaft 98, near its opposite end, is supported the month type-wheel 164 (Figs. 5 and 14), provided about its periphery with the names of the months of the year in type, this wheel being also, as indicated in Fig. 5, of the construction of the type-wheel 150 illustrated in Fig. 11. To prevent this wheel 164 from accidental turning it is provided about its periphery with a series of teeth 165, engaged by a dog 166 (Fig. 14), guidingly supported at openings in it on the tube 69 and shaft 89 and pressed by a spring 167 to engage at its upper end with the under side of the casing-section 43, which when closed engages the dog with the teeth 165 and when unlocked and open frees the spring 167 to raise the dog out of engagement with the teeth 165 and permit the month-wheel to be freely turned by hand for setting it. Adjacent to the wheel 164 is mounted on the shaft 98 the character-wheel 168 (Figs. 5, 20 and 21) provided with the sleeve 99 hereinbefore referred to and about its periphery with the type for printing desired legend matter, such as that shown in Fig. 22, the character-wheel being preferably of the construction most clearly shown in Fig. 21, which is the same as that of the wheel 150 illustrated in Fig. 11, involving a stepped recess 169 in one side about the hub, which is provided with a circumferential series of teeth 170 to be yieldingly engaged by the free end of a spring 171 contained in an enlargement 172 of the recess, the open side of the wheel being closed by a plate 173.

An inking-ribbon 182 is interposed between the various type-wheels and the impression pad 42, and for actuating it the following-described mechanism is provided: On the upper end-portions of each of the two suspended bearing-plates 87 and 88 are provided laterally-extending ears 175, and similar ears 176 extend laterally from the opposite edges of the plate 88 near its lower end. These two plates are rigidly held in place by screw-studs 177 passing through the side-walls of the casing-head to engage the plates near their lower edges. In opposite ears 175 are journaled, respectively, the ribbon-rollers 178 and 179 carrying on adjacent ends the ratchet-wheels 180 and 181; and the inking-ribbon extends between the two rollers and passes between its ends over suitably disposed guide-rods 183 (Fig. 3), which extend between opposite end-walls of the casing-head. In the ears 176, on the plate 88, are fastened to extend horizontally screw-studs carrying rollers 184 on which rides a carriage 185 (Figs. 12 and 13), shown of inverted general U-shape. On the outer face of the plate 88 is supported a vertically movable plate 186 surrounding an enlarged opening 187 near its lower end the character-wheel sleeve 99 and containing in the base of a U-shaped slot 188 in its upper end an extension 189 of the slot into which projects from the plate 88 a rigid stud 190 (Fig. 13) for guiding the sliding plate in its movements superinduced, as hereinafter described, by a foot 191 on the lower end of the sliding plate, between which and the sleeve 99 is confined about a vertical pin 192, a spiral spring 193. At opposite sides of the slot 188 are pivoted between their ends on the sliding plate 186 the two pawls 194 and 195 to engage respectively, with the ratchets 180 and 181, these pawls extending through similar openings 196 in the top of the carriage 185 which are longer than the width of the pawls; and at their hooked extremities the pawls are resiliently connected by a coiled spring 197. On the sleeve 99 is pivotally supported to extend upwardly along the inner face of the bearing-plate 88 an arm 198 (Fig. 15), containing a slot 199 where it passes the shaft 89 and forked at its upper end to afford bearings for corresponding ends of similar fixed rods 200, each being provided to bear one at a time against the adjacent roll of the ribbon 182. These rods are similarly supported at their opposite ends on an arm 201 (Fig. 5) journaled on the end of the stationary shaft 98, to extend along the outer face of the plate 87, from which it is shown to be spaced, and through an opening in which the key-end of the shaft 89 passes. The arm 201 is otherwise in all particulars like the arm 198, except that it is devoid of any slot 199 since the shaft 89 does not pass through it. The rods 200, however, pass through arc-shaped slots (Figs. 7 and 10) in the upper part of the plate 87. A stud 202 projects from the outer face of the arm 198, centrally between the forked prongs on its free end through a laterally elongated slot 203 (Fig. 12) in the bearing-plate 88 and pivotally engages on the opposite side of the bearing-plate 88 with a crank-arm 204 fulcrumed on the plate at 205 and provided on its free end with a laterally projecting finger 206, which affords a bearing for the upper end of a post 207 about which is confined between the finger 202 and a rigid collar on the end of the post, a spiral spring 208. The post is pointed at its lower extremity to have a rocking bearing in a recess 209 in the top of the carriage 185 for actuating the carriage in the following manner: Each time the time-stamp is operated by a blow upon the knob 45 to depress the swinging casing, the foot 191 on the plate 186 encounters, in the downward movement of the casing, the pad 42 whereby the continued movement of the casing raises the arm 186 with the result of raising both pawls, but the particular one engaging with a ribbon-roll ratchet the extent of one tooth of the latter, whereby when the casing rises under the recoil-action of its controlling spring 47 the foot 191 is freed from abutment against the pad and the spring 193 depresses it to lower the plate 186, which carries downwardly with it such pawl to turn the respective ratchet the extent of one tooth and thus wind the ribbon accordingly on the respective roll thereof from the other roll.

When the ribbon has been unwound more or less completely from one roll upon the other the increment of the latter turns the arms 198 and 201 by bearing against the respective rod 200 until the stud 202 has just passed the dead-center, when the recoil of the spring 204, which has been compressed by the movement of the arm 198, will snap the two arms to complete their throw, which is arrested by the encounter of the pin 202 with the end of the slot 203. As the result of either throw of the arms 198 and 201, superinduced by the recoil of the spring 204, the carriage 185 is shifted on its bearings 184 to withdraw one pawl, as the pawl 195, from engagement with its ratchet and engage the other pawl with its ratchet, thereafter to rewind the ribbon on the roll controlled by the other ratchet, as 180. Stops 174 are shown in Fig. 12 to be provided on the ends of the carriage in positions to encounter the edges of the bearing plate 88 for limiting the throw of the carriage. As shown in Fig. 15 the rods 200 are cut away at a point between their ends coincident with the edges of the dog 166 to avoid being obstructed by the latter in their movements.

To enable the gears in the train thereof to be set manually through the key, as is sometimes required, the ratchet 107 must be preparatorily freed from its actuating pawl and coöperating detent; and for this purpose the following-described mechanism is employed, reference being had particularly to Figs. 3, 5, 7 and 10: On the sleeve 108 surrounding the shaft 89 is loosely mounted a cam-disk 210 carrying on its outer side a stud 211 projecting through an arc-shaped slot 212 in the plate 87 for limiting the throw of the cam-disk, which is provided with the two cam-faces 213 and 214 to engage, respectively, with the stud 105 on the pawl 104 and a stud 215 on the detent 103$^1$. For holding the cam-disk in the positions to which it is thrown, a flat spring 216 is provided to bear between its ends against the stud 211, being fastened at one end to a post 217 on the plate 87 and confined at its opposite end against a pin 218 projecting from that plate.

When it is desired to free the ratchet 107, the upper section of the casing is unlocked by the use of the key 73, as hereinbefore described, permitting that section to be raised for access to the stud 211, turning of which from the normal position represented in Fig. 7 to that shown in Fig. 10 engages the cam-face 214 with the detent-stud 215 to disengage the detent from the ratchet, and the cam-face 213 with the stud 105 to similarly disengage the pawl 103, which is locked in its operative position by engagement at its recessed rear end with a stud 218 projecting inwardly from the plate 87, to prevent accidental turning of the ratchet between the gear-train actuating impulses which operate the train as follows: The terminals of the electromagnet 60 are connected by insulated wires 219 and 220 (Fig. 3), with an ordinary form of contact device in a master-clock (not shown), commonly employed with time-stamps, one known form of such device being a contact finger adapted to be engaged in succession by contact-points on a wheel in the clock-train, preferably the minute-wheel, and which for the purposes of the present time-stamp would be four in number spaced equally apart to encounter the contact-finger and close an electric circuit at intervals of fifteen seconds. Each closure of the circuit energizes the magnet 60 to attract its armature and, through the connection of the latter with the pawl 103, retract the pawl the extent of one ratchet-tooth to set it for turning the ratchet to that extent by the recoil-action of the spring 68 when the magnet is deënergized. The ratchet has twelve teeth, and since it is actuated under the impulse of the electromagnet each fifteen seconds, it makes a complete revolution in three minutes, thereby causing the gears 109 and 110 and with them the fractional minute type-wheel 112 to make a complete revolution in three minutes to repeat the series of characters upon it three times in each revolution.

The 3-tooth Geneva-pinion 113, which has the same motion as the ratchet, advances the 12-space Geneva-gear 114 one space each fourth impulse of the ratchet, whereby the gear 114 is advanced one space every minute. The 30-tooth gear 116 makes one complete revolution in twelve minutes and drives the 25-tooth gear 117 to make a complete revolution every ten minutes, thereby correspondingly driving the minute-unit type-wheel 119; and the 27-tooth gear 120 drives the similar gear 121 with the same motion. The 1-tooth Geneva-pinion 123 drives the 10-space Geneva-gear 124 one space every ten minutes to print the minute-tens, and causes it to make a complete revolution in two hours with six impulses per hour. The 30-tooth gear 127, by its engagement with the 25-tooth gear 128, has the same motion as the gear 124, namely one revolution every two hours. The 2-tooth Geneva-pinion 130 engages the 12-space Geneva-gear 131 to actuate it once every sixth impulse of that pinion, to print the hours successively in the complete revolution of the gear produced by twelve hour-impulses. The 1-tooth Geneva-pinion 134 drives the 12-space Geneva-gear 135 one space every twelve hours, and the 27-tooth gear 140 engages the similar gear 141 to transmit the motion of the gear 140 through the gear 141 to the "meridian" type-wheel 143, which makes one complete revolution in six days through twelve impulses, which bring into printing position, alternately, the characters "A. M." and "P. M." The spaced 12-tooth gear 144 is advanced one space every twelve hours and by its engagement with the 12-tooth pinion 145, advances the latter one space every twenty-four hours because, owing to the double space between the teeth of the gear 144, only the alternate impulses of that gear will cause it to engage the pinion 145. The 30-tooth gear 147 drives the 25-tooth gear 148 to turn the units-date type-wheel 150 one complete revolution in ten days, and the 1-tooth Geneva-pinion 151 by its engagement with the 10-space Geneva-gear 152 advances the latter one space every ten days to turn the tens-date type-wheel 154 which, owing to the arrangement of the type upon its periphery, namely 1—2—3, leaves the remainder of the space about the periphery of the wheel blank, since the wheel requires to be set back by hand to its starting position at the beginning of each month and remains at a blank space for the first nine days while the units-date wheel 150, which registers only with the tens-date wheel at the beginning of the tenth day, advances the tens-date wheel to 1 and remains at this point until the end of the nineteenth day. This movement will, obviously, be repeated on the twentieth and thirtieth days.

The knob 100 serves as an index in setting the character-wheel 168, being provided about its periphery with the same legend-matter as that provided on the character-wheel but in reverse order so that when certain such matter appears on the top of the knob its counterpart will occupy the printing position on the character-wheel. This is an expedient too common to require any illustration.

From the foregoing description of the printing mechanism on the two shafts 89 and 98 it will be seen that it is divided into what may be characterized as units, unit No. 1 comprising the year-wheel 162; unit No. 2, the ratchet, the sleeve 108 and the gear 109; unit No. 3, the two gears 110 and 113 and the type-wheel 112; unit No. 4, the hub 115 and the gears 114 and 116; unit No. 5, the type-wheel 119 and gears 117 and 120; unit No. 6, the hub 122 and gear 121 and 123; unit No. 7, the type-wheel 126 and the gears 124 and 127; unit No. 8, the hub 129 and gears 128 and 130; unit No. 9, the type-wheel 133 and gears 131 and 134; unit No. 10, the hub 136 and gears 135 and 140; unit No. 11, the type-wheel 143 on its hub 142 and gears 141 and 144; unit No. 12, the hub 146 and gears 145, 147 and 151; unit No. 13, the type-wheel 150 and gear 148; unit No. 14, the type-wheel 154 and gear 152; unit No. 15, the month type-wheel 164, and unit No. 16, the character-wheel 168.

The preferred primary actuating power for my improved time-stamp is that of electricity, but it would be within my invention to employ for the purpose any other suitable driving power.

It should be mentioned as a particular advantage of rigidly confining the electromagnet in the hinged casing instead, as heretofore, of providing it in the base of the time-stamp, that thereby the constant jar and pounding to which the magnet is subjected in the use of the device, will not injuriously affect the magnet or incur liability to shearing the wires with the result of causing a short circuit or of breaking the circuit. Moreover, by so providing the magnet in the hinged casing the danger of fire is avoided which exists where the magnet is housed in the base of the device, in the event of short-circuiting.

What I claim as new and desire to secure by Letters Patent is—

1. In a direct-geared time-stamp, a train of gears arranged on adjacent shafts to intermesh in succession from one shaft to another, said train being divided into units, including type-wheels, and the gears permanently interlocking while bearing fixed relation to each other, and a unit-forming type-wheel comprising a hub fixedly mounted on one of said shafts and containing in one side a stepped recess with teeth projecting from it in the inner part of said recess, a type-bearing annular rim loosely surrounding the hub, a spring-pawl on said rim engaging said teeth, and a plate covering the recessed side of the hub, for the purpose set forth.

2. In a direct-geared time-stamp, the combination with a base, of a casing having at one end a spring-hinge connection with the base and formed with an upper movable section provided with means for fastening it in closed condition, a train of gears arranged on adjacent shafts in said casing to intermesh in succession from one shaft to another, said train being divided into units, including type-wheels, and the gears permanently interlocking while bearing fixed relation to each other, a unit-forming type-wheel comprising a hub fixedly mounted on one of said shafts and provided with teeth, a type-bearing annular rim loosely surrounding said hub and provided with teeth, and a spring-pawl on said rim engaging said hub-teeth, and a spring-pressed dog supported in the casing to engage said rim-teeth and extending into the path of the upper casing-section to be depressed by closure thereof into engagement with said rim-teeth, for the purpose set forth.

3. In a direct-geared time-stamp, the combination with a base, of a casing having at one end a spring-hinge connection with the base and formed with a door on its free end, said door having an inwardly projecting finger, a train of gears arranged on adjacent shafts in said casing to intermesh in succession from one shaft to another, said train being divided into units, including type-wheels, and the gears permanently interlocking while bearing fixed relation to each other, and a unit-forming type-wheel comprising a recessed hub fixedly mounted on one of said shafts and provided with teeth, a type-bearing annular rim loosely surrounding the hub, a spring-pawl on said rim engaging said teeth, and a plate covering the hub-recess and provided with a sleeve extension having notches to be engaged by the finger on said door, for the purpose set forth.

4. In a time-stamp, the combination with a base, of a casing containing the stamping mechanism and having at one end a spring-hinge connection with the base, said casing being formed of separable longitudinal sections, and locking means for the sections comprising a key-actuated curved tumbler for one section and a bracket on the other section provided with a curved recess in position to be engaged by said tumbler.

5. In a time-stamp, the combination with a base, of a casing containing the stamping mechanism and having at one end a spring-hinge connection with the base, said casing being formed of separable longitudinal sections, and locking means for the sections comprising a key-actuated curved spring-tumbler on one section formed with an enlargement on its free end, and a bracket on the other section provided with a recess corresponding in shape to that of the tumbler and in position to be engaged thereby.

6. In a time-stamp, the combination with a base, of a casing containing the stamping mechanism and having at one end a spring-hinge connection with the base, said casing being formed of separable longitudinal sections, and locking means for the sections comprising a slotted tube extending through the casing wall of one of said sections and containing a longitudinal key-way, a key-way-forming ring rotatably confined in said tube and carrying at the slot therein to extend extraneously of the tube a tumbler, and a bracket on the other casing-section provided with a recess extending into position to be engaged by said tumbler.

7. In a time-stamp, the combination with a base, of a casing containing the stamping mechanism and having at one end a spring-hinge connection with the base, said casing being formed of separable longitudinal sections, and locking means for the sections comprising a slotted tube extending through the casing-wall of one of said sections and containing a longitudinal key-way, a key-way-forming ring rotatably confined in said tube and carrying at the slot therein to extend extraneously of the tube a curved spring-tumbler, a key-way-forming ring similarly confined in the tube adjacent to said tumbler-ring and carrying a head extending through said slot and fastened to the tumbler, and a bracket on the other casing-section provided with a curved recess in position to be engaged by said tumbler.

8. In a time-stamp, the combination with a base, of a casing containing the stamping mechanism and having at one end a spring-hinge connection with the base, said casing being formed of separably longitudinal sections, and locking means for the sections comprising a slotted tube extending through the casing-wall of said sections and containing a longitudinal key-way, brackets extending in pairs from the other section and containing curved tumbler-engaging recesses, pairs of key-way-forming rings rotatably confined in said tubes at the slots therein, one ring of each pair carrying a curved spring-tumbler to engage with a coincident tumbler-recess in a bracket and the other ring carrying a head secured to the adjacent tumbler.

9. In a time-stamp, the combination with a base, of a case containing the stamping-mechanism, including a rotatable shaft and provided with an opening coincident with an end of said shaft, said casing being formed of lower and upper longitudinal sections hinged together near one end, a lock for said sections, and a spring-controlled shutter normally closing said opening and maintained in that position by the upper section of the casing in its closed condition, whereby, to gain access to said shaft, said upper casing-section must be unlocked and raised to permit the shutter to uncover said opening.

10. In a time-stamp, the combination with a base, of a casing containing the stamping-mechanism, including a rotatable shaft, and provided with an opening coincident with said shaft, said casing being formed of lower and upper longitudinal sections hinged together near one end, a lock for said sections, and a shutter movably supported in the casing to normally cover said opening and provided with a spring tending to move it to uncover the same, and a lug on the upper casing-section bearing against the shutter, in the closed condition of the casing, for the purpose set forth.

11. In a time-stamp, the combination with a base, of a casing forming a neck-portion having a spring-hinge connection at one end with the base and terminating at its opposite end in a head with a door forming one wall thereof, said casing being formed of upper and lower longitudinal sections hinged together at one end and confining the door between them in normally closed condition, and a lock on said sections, for the purpose set forth.

12. In a time-stamp, the combination with a base, of a casing having at one end a spring-hinge connection with the base and containing in its free end the stamping mechanism, ratchet-carrying ribbon-rolls in said casing having connected with them the ends of a ribbon passing across the face of said mechanism, a reciprocating carriage, spring-pressed pawls for engaging said ratchets, means for actuating said pawls, one at a time, to move said ribbon, and means actuated by the increment of ribbon on one roll to disengage the adjacent pawl from its ratchet and shift the other pawl into engagement with its ratchet, for the purpose set forth.

13. In a time-stamp, the combination with a base, of a casing having at one end a spring-hinge connection with the base and containing in its free end the stamping-mechanism, ratchet-carrying ribbon-rolls in said casing having connected with them the ends of a ribbon passing across the face of said mechanism, a vertically movable spring-depressed impact-plate supported in the casing to project beyond said face and carrying spring-pressed pawls for engaging said ratchets, a carriage shiftably supported in the casing and engaging said pawls, arms rockingly supported in the casing and carrying to extend between their free ends rods adjacent to the ribbon-rolls, a pivotal crank connected at its free end with one of said arms, and a spring-pressed post extending from the free end of the crank into engagement with said carriage, for the purpose set forth.

14. In a time-stamp, the combination with a base, of a casing having at one end a spring-hinge connection with the base and containing in its free end the stamping-mechanism, bearing-plates in said casing, ratchet-carrying ribbon-rolls journaled on said plates and having connected with them the ends of a ribbon passing across the face of said mechanism, a vertically movable spring-depressed impact-plate supported in the casing project beyond said face and carrying spring-pressed pawls for engaging said ratchets, a carriage shiftably supported on said bearing-plate and engaging said pawls, arms rockingly supported in the casing adjacent to said bearing-plates and carrying to extend between their free ends rods adjacent to the ribbon-rolls, a crank pivoted to one of said bearing-plates to extend on one side thereof and having at its free end a finger, a spring-pressed post extending from said finger into rocking engagement with said carriage, a rocking arm and a pin extending from said rocking arm through a slot in the adjacent bearing-plate into engagement with said crank, for the purpose set forth.

15. In a time stamp, the combination with a base, of a casing having at one end a spring-hinge connection with the base, stamping-mechanism housed in the free end of the swinging casing, an electromagnet-seat on the base of the casing near its rear end, an electromagnet seated on said base, a saddle fitting upon the electromagnet and rigidly confining it in place, a spring-pressed reciprocating rod extending between the magnet-spools and carrying the armature of the magnet, and connections between said armature and stamping-mechanism for actuating the latter by impulses so energizing the magnet.

16. In a time-stamp, the combination with a swinging casing on a base, of stamping-mechanism in said casing, having a train of gears arranged on adjacent shafts to intermesh in succession from one shaft to another and permanently interlocking while bearing fixed relation to each other, said train including type-wheels, a ratchet on one shaft for actuating said train, a spring-pressed pawl and a spring-pressed detent engaging said ratchet, and a cam-device on the ratchet-shaft presenting cam-faces adapted to be engaged with the pawl and detent to disengage them from the ratchet for permitting said type-wheels to be set by hand.

17. In a time-stamp, the combination with a swinging casing on a base, of stamping-mechanism in said casing having a train of gears arranged on adjacent shafts to intermesh in succession from one shaft to another and permanently interlocking while bearing fixed relation to each other, said train including type-wheels, a ratchet on one shaft for actuating said train, a spring-pressed pawl and a spring-pressed detent engaging said ratchet and provided with studs, and a disk on the ratchet-shaft provided with cam-faces adapted to be engaged with said studs, for the purpose set forth.

18. In a time-stamp the combination with a swinging casing on a base, of stamping mechanism in said casing having a train of gears arranged on adjacent shafts to intermesh in succession from one shaft to another and permanently interlocking while bearing fixed relation to each other, said train including type-wheels, a ratchet on one saft for actuating said train, a spring-pressed pawl and a spring-pressed detent for engaging said ratchet, a cam-device on the ratchet-shaft presenting cam-faces and adapted to be manually operated to engage said faces with the pawl and detent, and a spring engaging said cam-device to yieldingly retain it in adjusted position, for the purpose set forth.

19. In a time-stamp, the combination with a swinging casing on a base, of bearing-plates in the casing, stamping-mechanism having a train of gears arranged on adjacent shafts supported on said plates to intermesh in succession from one shaft to another and permanently interlocking while bearing fixed relation to each other, said train including type-wheels, a ratchet on one shaft for actuating said train, a spring-pressed pawl and a spring-pressed detent engaging said ratchet and provided with studs, a disk on the ratchet-shaft provided with cam-faces adapted to be engaged with said studs, a setting pin projecting from said disk through a slot in one of said plates, and a spring confined against said pin, for the purpose set forth.

JACOB J. BUSENBENZ.

In presence of—
K. M. CORNWALL,
R. A. SCHAEFER.